US010103590B2

(12) United States Patent
Bueno De Santiago et al.

(10) Patent No.: US 10,103,590 B2
(45) Date of Patent: Oct. 16, 2018

(54) PERMANENT MAGNET ROTOR ASSEMBLY FOR A WIND TURBINE USING A WEDGE ATTACHMENT MECHANISM

(71) Applicant: ALSTOM RENEWABLE TECHNOLOGIES, Grenoble (FR)

(72) Inventors: Adrian Bueno De Santiago, Barcelona (ES); Santiago Claramunt Estecha, Barcelona (ES); César Muñiz Casais, Taradell (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 698 days.

(21) Appl. No.: 14/697,580

(22) Filed: Apr. 27, 2015

(65) Prior Publication Data
US 2015/0333585 A1    Nov. 19, 2015

(30) Foreign Application Priority Data

May 19, 2014    (EP) ..................... 14382175

(51) Int. Cl.
| | |
|---|---|
| *H02K 7/00* | (2006.01) |
| *H02K 1/28* | (2006.01) |
| *H02K 1/27* | (2006.01) |
| *F03D 9/00* | (2016.01) |
| *F16B 2/00* | (2006.01) |
| *F03D 9/25* | (2016.01) |

(Continued)

(52) U.S. Cl.
CPC .............. *H02K 1/28* (2013.01); *F03D 9/002* (2013.01); *F16B 2/00* (2013.01); *H02K 1/27* (2013.01);

(Continued)

(58) Field of Classification Search
CPC ............ H02K 1/27; H02K 1/278; H02K 1/28; H02K 7/1838; H02K 7/1807; H02K 15/0006; H02K 15/03

(Continued)

(56) References Cited

U.S. PATENT DOCUMENTS 7,355,309 B2    4/2008   Costin et al.
7,911,104 B2 *  3/2011   Ifrim .................... H02K 1/2773
                                                 310/156.19

(Continued)

FOREIGN PATENT DOCUMENTS

EP    1 750 349 A1    2/2007
EP    2 144 350 A2    1/2010

(Continued)

OTHER PUBLICATIONS

European Search Report for EP 14382175, dated Jan. 8, 2015, 7 pgs.

*Primary Examiner* — Bernard Rojas
*Assistant Examiner* — Maged Almawri
(74) *Attorney, Agent, or Firm* — Dority & Manning, P.A.

(57) ABSTRACT

A wedge mechanism including at least one wedge element and a guide member. The guide member is attached to the second assembly and adapted for receiving the wedge element in a way that and at least an inactive position of the mechanism is defined where the first and second assemblies can be detached from each other, and an active position where at least one of the wedge element and the guide member presses against two different sectors of the first assembly such that the first assembly and the second assembly remain attached to each other.

6 Claims, 3 Drawing Sheets

(51) Int. Cl.
*H02K 7/18* (2006.01)
*H02K 15/00* (2006.01)
*H02K 15/03* (2006.01)

(52) U.S. Cl.
CPC ............... *H02K 1/278* (2013.01); *F03D 9/25* (2016.05); *H02K 7/1838* (2013.01); *H02K 15/0006* (2013.01); *H02K 15/03* (2013.01)

(58) Field of Classification Search
USPC ............ 290/55; 310/156.19, 216.125, 156, 310/156.08, 156.09, 156.11, 156.12, 310/156.13, 156.66, 156.72, 156.74, 310/216.126
See application file for complete search history.

(56) References Cited

U.S. PATENT DOCUMENTS

| | | |
|---|---|---|
| 8,648,511 B2 | 2/2014 | Booth et al. |
| 8,957,555 B2 * | 2/2015 | Pabst .................... H02K 1/2773 310/156.16 |
| 2007/0090711 A1 | 4/2007 | Carl et al. |
| 2008/0093945 A1 | 4/2008 | Gruenhagen |
| 2009/0250935 A1 | 10/2009 | Kim et al. |
| 2010/0231085 A1 * | 9/2010 | Ifrim .................... H02K 1/2773 310/216.123 |
| 2012/0286520 A1 * | 11/2012 | Booth .................... H02K 1/278 290/55 |
| 2013/0062975 A1 * | 3/2013 | Pabst .................... H02K 1/2773 310/59 |
| 2013/0154272 A1 * | 6/2013 | Rebsdorf ............. H02K 7/1838 290/55 |

FOREIGN PATENT DOCUMENTS

| | | |
|---|---|---|
| EP | 2 458 714 A1 | 5/2012 |
| EP | 2 498 376 A1 | 9/2012 |
| EP | 2 555 381 A1 | 2/2013 |
| EP | 2 648 316 A1 | 10/2013 |
| WO | WO 2012/152878 | 11/2012 |

* cited by examiner

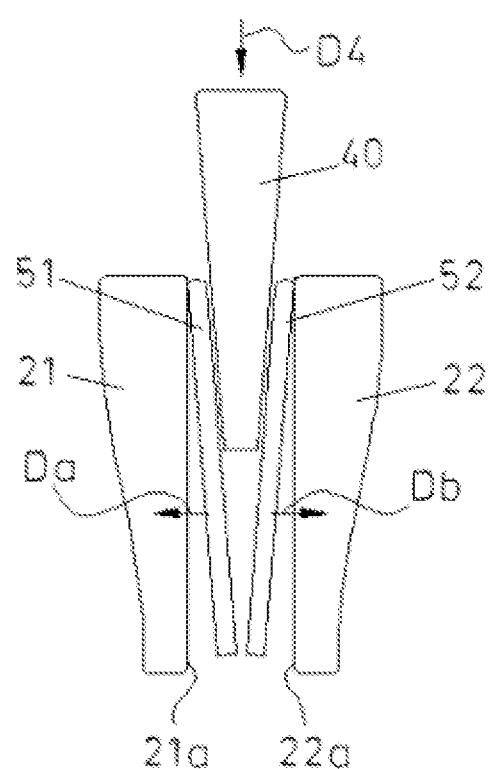

PERMANENT MAGNET ROTOR ASSEMBLY FOR A WIND TURBINE USING A WEDGE ATTACHMENT MECHANISM

This application claims priority to European application no. 14382175.9 filed May 19, 2014, the entire contents of which are hereby incorporated by reference for all purposes.

The present disclosure relates to mechanisms for attaching two or more assemblies to each other, in particular in wind turbine applications.

BACKGROUND

There are a number of assemblies in wind turbine applications which need to be attached to other assemblies or parts of a wind turbine. For example, in direct drive systems for wind turbines, e.g. offshore wind turbines, which use permanent magnet generators, that is, generators where the excitation field is provided by permanent magnets instead of a coil, a number of magnets are arranged in modules. The magnet modules need to be attached to the wind turbine rotor.

The attachment of a magnet module to the rotor may be carried out in different ways. The magnet module may be for example attached to the rotor directly, such as by welding, through bolted connections. The magnet module or even the magnets themselves may be attached to the rotor glued to a rotor body, by stamping the ends of the magnets to hold them in place, attached through the use of clamps coupled to the rotor body or directly to the rotor rim, etc.

One disadvantage with the above ways for attaching the assemblies in a wind turbine is the large amount of welding that is required which is very time consuming and labour intensive.

A further disadvantage is that a large number of bolts are used. In addition, in attachment by gluing reliability is reduced as it is difficult to ensure attachment of the assemblies over time.

In order to at least mitigate the above disadvantage, the above ways for attaching the magnets to a wind turbine rotor have been combined with the use of guide means.

For example, in document US2008093945 the magnets are inserted longitudinally into guide means. The guide means comprise wedge shaped guide grooves that are formed in the rotor. The guide grooves are adapted for receiving the magnets such that they are distributed at the periphery of the rotor and fastened therein. A medium that hardens by a chemical reaction and/or thermal treatment is provided. Such medium is intended for ensuring the attachment of the magnets in the grooves filling the gaps existing therebetween.

Document US2009250935 also discloses the use of guide means comprising grooves that are arranged spaced at regular intervals on the rotor. The grooves have a corresponding trapezoidal shape adapted for receiving trapezoidal shaped magnets. The magnets are attached to the rotor by melting portions of the magnets bonded to the rotor by a high temperature atmosphere.

Document EP2523316 filed by the present applicant discloses a generator rotor having a rotor rim upon which a plurality of permanent magnet modules is arranged extending in an axial direction of the generator rotor. T-shaped anchors are fitted in corresponding grooves that are formed in the wind turbine rotor. Such anchors are provided with bores suitable for accommodating bolts for fixing the anchor to the rotor rim. The permanent magnet modules are inserted between two neighbouring anchors and fixed in place by means of bolts.

The above solutions for attaching different assemblies to each other in a wind turbine have been shown to be reliable and efficient. However, maintenance and repair operations become cumbersome. For example, in the case where the magnets are attached to the wind turbine rotor according to the above disclosed ways, when one or more magnets needs to be replaced, detachment becomes very complicated as bolts are not easily accessible and removal of welding is complex. This hampers maintenance and repair operations rendering them costly. Assembly operations are also complex and time consuming since the bolts are usually locked with glue one by one after they have been completely inserted.

There is thus a need for a mechanism that is capable of providing an easy attachment and detachment of assemblies in wind turbine applications, such as for example for attaching magnet modules to the rotor, as well as parts of the wind turbine stator, such as poles or active part portions of the wind turbine stator.

The present mechanism for attaching two assemblies to each other in wind turbine applications has been developed in order to overcome or at least mitigate the above disclosed disadvantages related to prior art solutions. It has been also found that the present mechanism provides a number of additional advantages as it will be disclosed hereinbelow.

SUMMARY

A mechanism for attaching at least a first assembly and a second assembly in wind turbine applications is provided. The first assembly comprises a number of sectors. As used herein, a sector means an area, portion or region of the assembly.

The first assembly may be, for example, rotor active parts such as a wind turbine magnet module assembly. In this case, a magnet module sector is an area, portion or region of the magnet module.

The second assembly may be a wind turbine rotor, and specifically a wind turbine rotor rim. Other examples are not ruled out such as those in which the first assembly is a wind turbine stator active part portion and the second assembly is a wind turbine stator structure such a stator housing. The stator active part portion is formed by stator teeth around which a coil is provided.

The present mechanism is referred herein to as wedge mechanism as it comprises at least one wedge element. A wedge element as used herein is a piece or block having at least one inclined plane.

The present mechanism further comprises a guide member that is attached to the second assembly. The guide member is adapted for receiving the above mentioned wedge element.

With the above configuration, at least an inactive position of the mechanism and an active position of the mechanism are defined. In the inactive position of the mechanism the first assembly and the second assembly can be detached from each other, for example for maintenance and repair operations. In the active position of the mechanism at least one of the wedge element and the guide member presses against two different sectors, that is, areas, portions or regions, of the first assembly. The first assembly and the second assembly remain attached to each other ready for operation.

In some cases, the magnet module assembly may comprise a number of magnet modules. In this particular case, the wedge parts of the wedge element, in use, act on sectors of different magnet modules. In other cases, however, the wedge element, in use, act on different sectors of the same magnet module. In this latter case, there is the advantage that the assemblies formed of magnet modules with the corresponding wedge mechanisms acting on different sectors of the same magnet module are separate from each other. This results in that the assembly and replacing operations are facilitated.

An effective way to attach and detach two or more assemblies in the wind turbine is obtained as well as a great accessibility both for assembly and maintenance operations. The provision of a guide member results in that assembly time is also reduced since much fewer bolts and welding is required. In addition, there is no need of pins between the assemblies such as the wind turbine rotor and guide member to withstand tangential loads. In the case of attaching parts of the wind turbine stator, the assembly time is reduced as welding is avoided as compared to prior art solutions.

In preferred examples, the wedge element of the mechanism may comprise at least two wedge parts and the guide member is adapted for slidingly receiving the wedge parts. A relative axial displacement of said wedge parts along the guide member causes the wedge parts to press against two different sectors of the first assembly. The force applied to respective opposite narrow ends of different, adjacent wedge parts is converted into forces perpendicular to the respective inclined surfaces of said wedge parts. This results in outer surfaces of the wedge parts pressing against the opposite sectors of the first assembly such that the first assembly and the second assembly are maintained attached to each other.

In further examples, the guide member may comprise at least two guide portions. The guide portions of the guide member are adapted for receiving at least one wedge element therebetween. As the wedge element is fitted between the guide portions of the guide member, said guide portions are forced to open outwards towards different sectors of the first assembly. This results in the first assembly and the second assembly are maintained attached to each other.

In the above example where the guide member comprises at least two guide portions, the guide portions may be adapted to open outwards towards different sectors of the first assembly when the wedge element is fitted axially therebetween. Still in the above example, the guide portions of the guide member may be adapted to open outwards towards different sectors of the first assembly when the wedge element is fitted radially therebetween. In any case, the wedge element may comprise at least two wedge parts.

The present mechanism provides an improved feasibility of assembly and fastening operations of the generator active parts such as rotor magnet modules, stator core, etc.

A generator comprising a stator, a rotor and a number of permanent magnets is also disclosed herein. The generator further comprises the wedge mechanism described above for attaching the magnets to the rotor.

A wind turbine comprising the above generator having said wedge mechanism for attaching the magnets to the rotor, for attaching stator active part portion to a stator structure, etc.

BRIEF DESCRIPTION OF THE DRAWINGS

Non-limiting examples of the present disclosure will be described in the following, with reference to the appended drawings, in which:

FIG. 4 is a schematic top plan view of one variant of the second example of the wedge mechanism shown in FIG. 3.

DETAILED DESCRIPTION OF EXAMPLES

Figure 1:
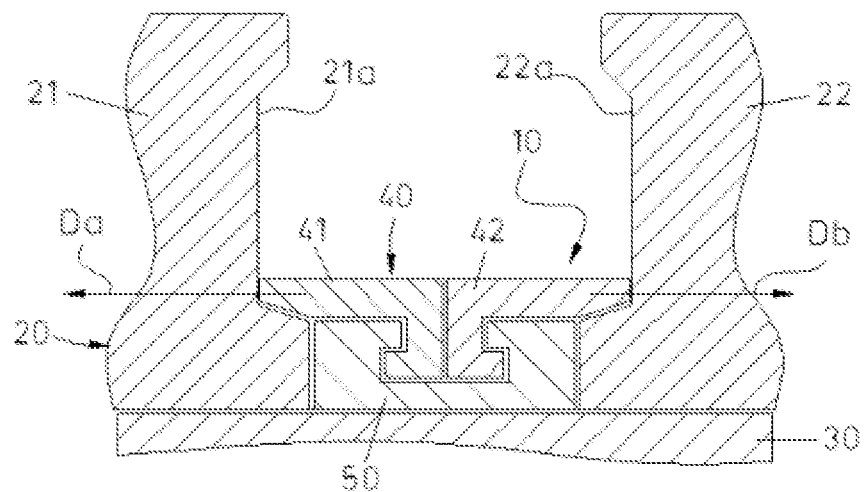
FIG. 1 diagrammatically shows a sectional view of a first example of the wedge mechanism.

The drawings show two non-limiting examples of the present wedge mechanism 10. In both examples, the mechanism 10 shown is intended for attaching a wind turbine magnet module assembly 20, that is, a whole series of magnet modules, to a wind turbine rotor rim 30. The magnet module assembly 20 comprises a number of sectors 21, 22, only two of which have been shown in the drawings for simplicity. Sectors 21, 22 represent a part, area or region of different magnet modules.

Figure 2A:
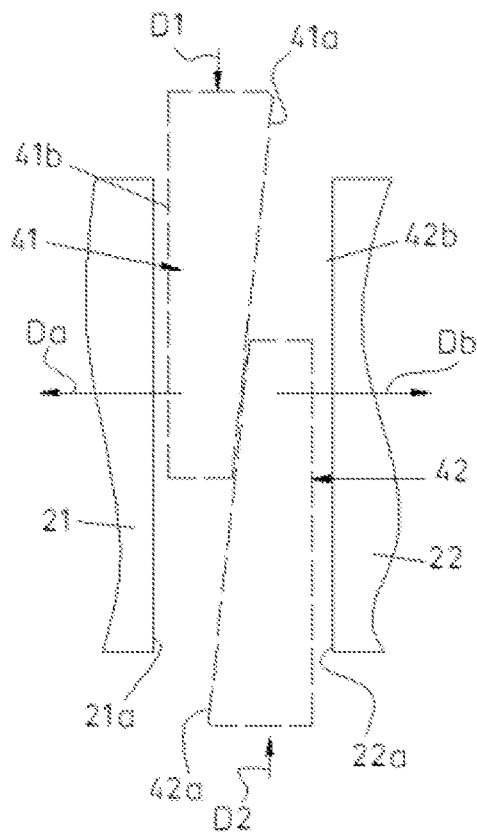
FIG. 2a is a schematic top plan view of the first example of the wedge mechanism of FIG. 1 shown in a position before being mounted on the guide member.
Figure 2B:
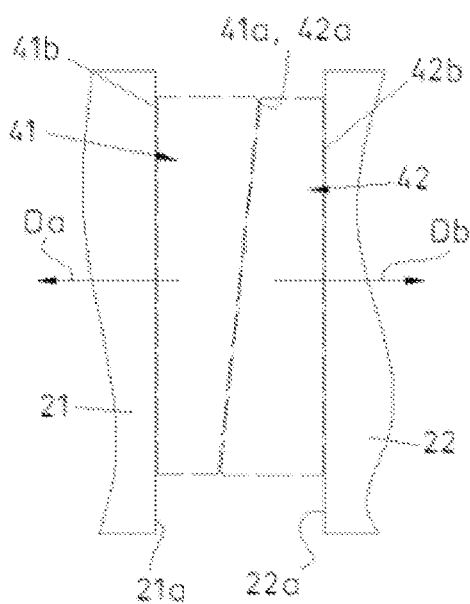
FIG. 2b is a schematic top plan view of the first example of the wedge mechanism of FIG. 1 shown in a position already mounted on the guide member.

The mechanism 10 shown in the drawings comprises a wedge element 40. As shown in FIGS. 2a-2b, the wedge element 40 is a block having at least one inclined plane 41a, 42a.

The mechanism 10 further comprises a guide member 50 that may be manufactured for example by extrusion. The guide member 50 is attached to the rotor rim 30, for example welded and/or bolted. The guide member 50 is adapted for slidingly receiving the wedge element 40. The wedge element 40 can be moved, i.e. slide, along the guide member 50.

In accordance with the above general configuration of the mechanism 10, two examples are shown in the figures.

In the first example shown in FIGS. 1 and 2a-2b, the mechanism 10 comprises two wedge parts 41, 42. As it can be seen from FIGS. 2a-2b, the wedge parts 41, 42 are arranged inversely with their inclined planes 41a, 42a facing each other. The respective opposite surfaces 41b, 42b of the wedge parts 41, 42 are arranged facing the respective inner surfaces 21a, 22a of the opposite sectors 21, 22 of the magnet module assembly 20.

The wedge parts 41, 42 in the example shown in FIG. 1 have a substantially a L-shaped cross-section while the guide member 50 has a substantially C-shaped cross-section for complementarily receiving the two wedge parts 41, 42 therein.

FIGS. 2a and 2b diagrammatically show in respective top plan views the first example of the wedge mechanism 10 in a position before and after the wedge parts 41, 42 have been mounted on the guide member 50, respectively.

Starting from the position of the wedge parts 41, 42 shown in FIG. 2a, for attaching the magnet module assembly 20 to the rotor rim 30, with the guide member 50 already fixed to the rotor rim 30, the wedge parts 41, 42 are pushed in opposite axial directions as shown by arrows D1, D2 through the guide member 50. Axial movement of the wedge parts 41, 42 means herein that the wedge parts 41, 42 are pushed in a direction substantially parallel to that of the longitudinal axis of the rotor. The wedge parts 41, 42 are pushed in the opposite axial directions D1, D2 through the guide member 50 until the wedge parts 41, 42 are arranged with their respective inclined planes 41a, 42a facing each other and substantially in full contact with each other.

Since the wedge parts 41, 42 are arranged inversely with their inclined planes 41a, 42a facing each other, the relative axial displacement of the wedge parts 41, 42 along the guide member 50 results in that the overall width of the wedge element 40 is increased due to the lateral movement of the wedge parts 40, 41 as shown by arrows Da and Db in FIGS. 2a-2b. This results in that the opposite surfaces 41b, 42b of the wedge parts 41, 42 press against the respective inner surfaces 21a, 22a of the opposite sectors 21, 22 of the magnet module assembly 20 such that the magnet module assembly 20 is attached to the rotor rim 30 reaching the active position of the mechanism 10 shown in FIG. 2b of the drawings.

In the first example shown in FIGS. 1 and 2a-2b where the wedge assembly 10 comprises a wedge element 40 formed with two wedge parts 41, 42 together with a guide member 50, attachment of the parts, that is, the magnet module assembly 20 and the rotor rim 30, is performed as the wedge parts 41, 42 are moved relative to each other along the guide member 50. This is advantageous in that the magnet modules in the magnet module assembly 20 can be mounted radially instead of axially as stated above.

Radial mounting of magnet modules in the magnet module assembly 20 is in any case only possible in this example while the rotor is arranged outside the stator in an assembly stage, but not after final arrangement of the generator. Radial mounting of magnet modules starts when the opposite surfaces 41b, 42b of the wedge parts 41, 42 are substantially aligned with the outer surfaces of the guide member 50. Then, as the wedge parts 41, 42 are displaced axially to each other (arrows Da and Db) along the guide member 50, they spread outwards such that the opposite surfaces 41b, 42b of the wedge parts 41, 42 protrude from the outer surfaces of the guide member 50 pressing against the inner surfaces 21a, 22a of the sectors 21, 22 of the magnet module assembly 20. The magnet module assembly 20 then becomes attached to the rotor rim 30 reaching the above mentioned active position shown in FIG. 2b.

Figure 3:
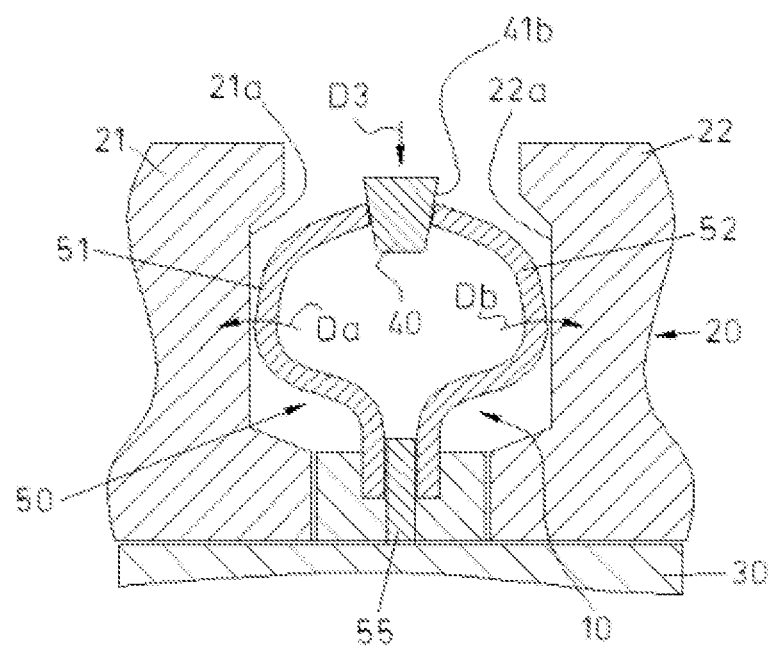
FIG. 3 diagrammatically shows a sectional view of a second example of the wedge mechanism.

In the second example shown in FIG. 3, the guide member 50 of the mechanism 10 comprises a base member 55 that is attached to the rotor rim 30, for example welded and/or bolted. The guide member 50 further comprises two opposite guide portions 51, 52 adapted for receiving at least one wedge element 40 therebetween. In some cases, the guide portions 51, 52 could be formed as a single piece. The guide portions 51, 52 may preferably be of an elastic nature.

In said second example in FIG. 3, the wedge element 40 has opposed inclined planes 41b. The outer surface of the guide portions 51, 52 are adapted to be in direct contact with the respective inner surfaces 21a, 22a of the opposite sectors 21, 22 of the magnet module assembly 20. For attaching the magnet module assembly 20 to the rotor rim 30, the wedge element 40 is inserted between the guide portions 51, 52 radially, that is, by being pushed in the direction shown by arrow D3. Radial movement of the wedge element 40 means herein that the wedge element 40 is pushed in a direction substantially perpendicular to that of the longitudinal axis of the rotor. This causes the guide portions 51, 52 to be forced to open outwards towards the inner surfaces 21a, 22a of the opposite sectors 21, 22 of the magnet module assembly 20. This results in that the magnet module assembly 20 and the rotor rim 30 are maintained attached to each other reaching an active position of the mechanism 10.

FIG. 4 shows one variant of the above mentioned second example in FIG. 3. In this variant, the wedge element 40 may be inserted between the guide portions 51, 52 axially, that is, in a direction shown by arrow D4 in FIG. 4, that is, a direction substantially parallel to that of the longitudinal axis of the rotor. In this particular case, the guide portions 51, 52 are arranged inclined to each other as shown in top view in FIG. 4 and with the guide portions 51, 52 being substantially parallel to the inclined planes 41a, 42a of the wedge parts 41, 42.

In the above variant for attaching the magnet module assembly 20 to the rotor rim 30, shown in FIG. 4, the wedge element 40 is inserted between the guide portions 51, 52 axially in the direction shown by arrow D4. This causes the guide portions 51, 52 to be forced to open outwards towards the inner surfaces 21a, 22a of the opposite sectors 21, 22 of the magnet module assembly 20. This results in that the magnet module assembly 20 and the rotor rim 30 are maintained attached to each other (active position of the mechanism 10).

According the above mentioned second example shown in FIGS. 3 and 4, the guide portions 51, 52 of the guide member 50 may be made thinner in unloaded areas. In general, the guide member 50 may be interference fit with the magnet module assembly 20 or in contact therewith in the attachment process.

The reverse relative movement of the wedge parts 41, 42, or the reverse relative movement of the wedge element 40 and the guide portions 51, 52 of the guide member 50 causes the mechanism 10 to reach an inactive position where the magnet module assembly 20 can be disassembled from the rotor rim 30 for maintenance and repair operations.

Although only a number of examples have been disclosed herein, other alternatives, modifications, uses and/or equivalents thereof are possible. For example, the magnet module assembly may be formed of a number of magnet modules. In use, the wedge parts of the wedge element may act on sectors of different magnet modules. In other cases, however, the wedge element may act on different sectors of the same magnet module, in use.

All possible combinations of the described examples are also covered. Thus, the scope of the present disclosure should not be limited by particular examples, but should be determined only by a fair reading of the claims that follow.

The invention claimed is:

1. A permanent magnet rotor assembly for a wind turbine, comprising:
   a rotor defining a rotor rim;
   a plurality of permanent magnet modules arranged longitudinally on the rotor rim adjacent to each other around a circumference of the rotor rim;
   at least two wedge parts, each wedge part comprising a first portion defining an inclined plane inner surface and a second portion defining an opposite outer surface;
   a longitudinally extending guide member mounted directly to the rotor rim between adjacent ones of the permanent magnet modules; and
   the first portion of the wedge parts slidable into the guide member with the inclined plane inner surfaces facing such that axial displacement of the wedge parts along the guide member causes the outer surfaces of the second portion of the wedge parts to move perpendicular to a longitudinal axis of the rotor and engage against facing inner surfaces of the adjacent permanent magnet modules in an active position of the wedge parts to attach the permanent magnet modules to the rotor rim.

2. The permanent magnet rotor assembly of claim 1, wherein the guide member does not engage against the facing inner surfaces of the adjacent permanent magnet modules in the active position of the wedge parts.

3. The permanent magnet rotor assembly of claim 1, wherein the guide member comprises a substantially C-shaped cross section, wherein the second portion of the wedge parts extends out of and the C-shaped cross section.

4. The permanent magnet rotor assembly of claim 3, wherein the wedge parts comprise a substantially L-shaped cross section, a smaller leg of the L-shaped cross section defining the first portion slidable into the C-shaped cross section of the guide member, and a longer leg of the L-shaped cross section defining the second portion of the wedge part.

5. A wind turbine generator, comprising the permanent magnet rotor assembly of claim 1.

6. A wind turbine, comprising the wind turbine generator of claim 5.

\* \* \* \* \*